(12) United States Patent
Lee et al.

(10) Patent No.: US 7,343,072 B2
(45) Date of Patent: Mar. 11, 2008

(54) LIGHT MODULATOR PACKAGE HAVING INCLINED LIGHT TRANSMISSIVE LID

(75) Inventors: Yeong Gyu Lee, Gyeonggi-do (KR); Dong Ho Shin, Seoul (KR); Heung Woo Park, Seoul (KR); Jun Won An, Gyeonggi-do (KR); Yurlov Victor, Gyeonggi-do (KR)

(73) Assignee: Samsung Electro-Mechanics, Co., Ltd., Kyunggi-Do (KR)

( * ) Notice: Subject to any disclaimer, the term of this patent is extended or adjusted under 35 U.S.C. 154(b) by 0 days.

(21) Appl. No.: 11/244,769

(22) Filed: Oct. 6, 2005

(65) Prior Publication Data

US 2006/0078256 A1    Apr. 13, 2006

(30) Foreign Application Priority Data

Oct. 8, 2004   (KR) .................. 10-2004-0080489

(51) Int. Cl.
*G02B 6/32*   (2006.01)
*G02B 6/26*   (2006.01)

(52) U.S. Cl. .................. 385/49; 385/39; 385/33; 385/31; 385/15

(58) Field of Classification Search .................. 385/31, 385/39, 41
See application file for complete search history.

(56) References Cited

U.S. PATENT DOCUMENTS

| 5,311,360 | A  |   | 5/1994  | Bloom et al. |
| 5,631,987 | A  | * | 5/1997  | Lasky et al. .................. 385/88 |
| 5,797,668 | A  | * | 8/1998  | Kojima et al. .............. 362/618 |
| 6,303,986 | B1 |   | 10/2001 | Shook |
| 6,709,170 | B2 | * | 3/2004  | Tartaglia et al. ............... 385/94 |
| 6,872,984 | B1 | * | 3/2005  | Leung .......................... 257/81 |
| 7,001,083 | B1 | * | 2/2006  | Nguyen et al. ............... 385/94 |

\* cited by examiner

*Primary Examiner*—Frank G. Font
*Assistant Examiner*—Eric Wong
(74) *Attorney, Agent, or Firm*—Christensen O'Connor Johnson Kindness PLLC

(57) ABSTRACT

Disclosed herein is a light modulator package having an inclined light transmissive lid which is manufactured or positioned such that a surface of the light transmissive lid is inclined relative to a reflective surface of a light modulating array.

5 Claims, 4 Drawing Sheets

LIGHT MODULATOR PACKAGE HAVING INCLINED LIGHT TRANSMISSIVE LID

BACKGROUND OF THE INVENTION

1. Field of the Invention

The present invention relates generally to a light modulator package and, more particularly, to a light modulator package having an inclined light transmissive lid which is manufactured or positioned such that a surface of the light transmissive lid is inclined relative to a reflective surface of a light modulating array.

2. Description of the Related Art

As the Internet and mobile phones have become popular, the information age is rapidly arriving, and the amount of information is dramatically increasing. Further, the construction of infrastructure for information systems is becoming a matter of primary concern of a national undertaking.

This inevitably requires the communication and storage of information. The affordability, miniaturization, high-capacity, and digitization of information and communication devices, information displays, and recording devices have been achieved. Faster data transmission and storage of a greater amount of data in a limited space are required. Further, the market demand for products increasing a user's convenience and mobility is continuously growing.

Meanwhile, a micromachining technology has been developed, which manufactures micro-optical parts including a micromirror, a micro lens, and a switch, a micro inertia sensor, a micro biochip, and a micro wireless communication device, using a semiconductor device manufacturing process.

Further, MEMS designating the micromachining technology, devices and systems manufactured by the micromachining technology have been established as an independent manufacturing technology and application field.

The MEMS are called micro-electro-mechanical systems or devices, and are applied to an optical field. When using the micromachining technology, it is possible to manufacture an optical part smaller than 1 mm. Thereby, a micro-optical system can be attained. A separately manufactured semiconductor laser is mounted on a holder which is manufactured through the micromachining technology, and a micro Fresnel lens, a beam splitter, and a 45° reflecting mirror are manufactured through the micromachining technology and subsequently assembled. A conventional optical system is configured such that the mirror, the lens, etc. are mounted on a large and heavy optical bench using an assembling tool. The laser is also large in size. In order to obtain desired performance of the optical system configured as described above, a precise stage and much effort are required to arrange an optical axis, a reflecting angle, a reflective surface, etc.

However, the micro optical system is advantageous in that it reduces the tools, space, and effort required, in addition to achieving performance different from that of the conventional optical system.

The micro optical system has several advantages, that is, fast response speed, reduced light loss, and easy integration and digitization. Due to such advantages, the micro optical system is adapted and applied to information and communication devices, information displays, and recording devices.

Conventionally, an accelerometer, a pressure sensor, an inkjet head, a head for hard discs, a projection display, a scanner, micro fluidics, and others are produced using the MEMS technology and are commercialized. Recently, due to the development of optical communication technology, interest in technology realizing higher performance optical communication parts is increasing.

Particularly, people have an increasing interest in a spatial light modulator using a switching technique which drives the micromirror by an actuator in the MEMS manner. Such a light modulator is advantageous in that it has high speed, parallel processing capacity, and mass information processing capability, unlike the conventional digital information processing technology which is problematic in that it is impossible to process a great amount of data in real time.

At present, studies have been conducted on the design and production of a binary phase only filter, an optical logic gate, a light amplifier, image processing technique, an optical device, a light modulator, etc. using the above-mentioned light modulator. Especially, the spatial light modulator is adapted to optical memory, optical display devices, printers, optical connections, holograms, and displays.

The light modulator is embodied by a reflective deformable grating light modulator 110 as shown in FIG. 1. The light modulator 110 is disclosed in U.S. Pat. No. 5,311,360 by Bloom et al. The modulator 110 includes a plurality of reflective deformable ribbons 118, which have reflective surface parts, are suspended on an upper part of a silicon substrate 116, and are spaced apart from each other at regular intervals. An insulating layer 111 is deposited on the silicon substrate 116. Subsequently, a sacrificial silicon dioxide film 112 and a silicon nitride film 114 are deposited.

The nitride film 114 is patterned by the ribbons 118, and a portion of the silicon dioxide film 112 is etched, thereby maintaining the ribbons 118 on the oxide spacer layer 112 by a nitride frame 120.

In order to modulate light having a single wavelength of $\lambda_o$, the modulator is designed so that the thickness difference between the ribbon 118 and an oxide spacer 112 is equal to $\lambda_o/4$.

Limited by a vertical distance d between a reflective surface 122 of each ribbon 118 and a reflective surface of the substrate 116, a grating amplitude of the modulator 110 is controlled by applying voltage between the ribbon 118 (the reflective surface 122 of the ribbon 118 acting as a first electrode) and the substrate 116 (a conductive layer 124 formed on a lower side of the substrate 116 to act as a second electrode).

However, the light modulator of Bloom uses an electrostatic manner to control the position of the micromirror. In this case, the light modulator is problematic in that an operating voltage is relatively high (about 20V or so), and the relation between applied voltage and displacement is nonlinear. Consequently, such a light modulator cannot reliably control light.

The MEMS elements as well as the reflected light modulator of Bloom have ultra-fine actuators so that the MEMS elements are greatly sensitive to the external environment, including temperature, humidity, micro-dust, vibration and impact, and thereby a proper method of sealing is required.

U.S. Pat. No. 6,303,986 discloses a method and apparatus for sealing MEMS elements using a hermetic lid to provide an MEMS package.

Herein below, the construction of the MEMS package disclosed in U.S. Pat. No. 6,303,986, in which the lid glass hermetically seals the MEMS elements from the external environment, will be described with reference to FIG. 2.

FIG. 2 shows a representative sectional view of the MEMS package in which the transparent lid hermetically seals the MEMS element. As shown in FIG. 2, a conductive ribbon 300 having a metallic conductive/reflective covering 302 is formed over an upper surface of a semiconductor substrate 304, with an air gap 306 defined between the ribbon 300 and the substrate 304.

A conductive electrode 308 is formed on the upper surface of the substrate 304 and covered with an insulation layer 310. The conductive electrode 308 is placed under the ribbon 300 at a position under the air gap 306.

The conductive/reflective covering 302 extends beyond the region of the mechanically active ribbon 300 and is configured as a bond pad 312 at its distal end. The MEMS package is also passivated with a conventional overlying insulating passivation layer 314 which does not cover the bond pads 312 or the ribbon structures 300 and 302.

Control and power signals are coupled to the MEMS package using conventional wire-bonding structures 316.

Unlike conventional semiconductor manufacturing techniques in which semiconductor elements are packed densely onto the upper surface of a semiconductor substrate, an optical glass is hermetically sealed directly onto the semiconductor substrate in the above-mentioned U.S. patent. Thus, the bond pads 312 are spaced a considerable distance from the ribbon structures 300 and 302, so that a lid sealing region 318 is provided. A solderable material 320 is formed onto the lid sealing region 318.

The hermetic lid 322, which is joined to the semiconductor substrate, is preferably formed of an optical quality material. Thus, the lid 322 can be used for a variety of purposes including filtering undesired radiation, enhancing reflectivity, or decreasing reflectivity.

The lid 322 may be also coated with an optically sensitive material to be used for other purposes without being limited to the above-mentioned purposes.

Once the lid 322 is formed to a size appropriate to fit concurrently over the lid sealing region 318, with a solderable material 324 formed in a ring surrounding the periphery of one surface of the lid 322, solder 326 is deposited onto the solderable material 324 so that the lid 322 is joined to the semiconductor substrate.

Though not shown to scale in the drawing, a significant space exists between the lid 322 and the ribbon structures 300 and 302 to prevent them from interfering with one another. Thus, the ribbon structures 300 and 302 are free to move upwards and downwards.

FIG. 3 shows a plan view of an exemplary package disclosed in the above-mentioned US patent wherein various regions are shown as blocks. As shown in the drawing, the ribbon structures of a GLV (diffraction grating light valve) to be used as a display engine comprise a mechanically active region 340, while the lid sealing region 318 surrounds the mechanically active region 340.

In this case, the lid sealing region 318 is passivated and includes no mechanically active elements, such as those traditionally found in MEMS devices.

Furthermore, the lid sealing region 318 includes no bond pads where other off-chip interface structures, such as the lid 322, would interfere with the effective operation of the MEMS device. However, it is possible that the lid sealing region 318 could include active electronic elements. In the event that the lid sealing region 318 did include active electronic elements, effort must be taken to planarize that region in order to provide the surface to which the lid 122 can properly mate.

The bonding region 342 surrounds the lid sealing region 318, and includes several bond pads necessary for making interconnection from the package to off-chip circuits and systems.

As described above, the lid is usually positioned parallel to the reflective surface of the light modulator. Thus, due to the scattering over the reflective surface of the light modulator, undesired optical noise is generated, and thereby the optical noise deteriorates the performance of the light modulator.

FIG. 4 is a view to illustrate the optical noise of a conventional light modulator package. In the drawing, reference numeral 500 denotes a substrate, reference numeral 510 denotes a light modulating element, and reference numeral 532 denotes a light transmissive lid.

Referring to the drawing, the conventional light modulator package generates three types of optical noise.

(1) SLS (Surrounding Landscape Scattering) is the optical noise caused by reflection and scattering in an optical system.

(2) WR (Window Reflections) is the optical noise caused by the reflection on the light transmissive lid (especially, the light transmissive window), and comprises first WR (FWR) and second WR (Second WR). The FWR is the optical noise caused by the reflection of light incident through the light transmissive window of the light transmissive lid 532, while the SWR is the optical noise caused by the reflection of light diffracted on the light modulating element 510. As shown in the drawing, the FWR includes reflected light 1-1, 1-2, and 1-3. In this case, incident light 1 is reflected on a surface of the light transmissive lid 532, thus generating the reflected light 1-1. The incident light 1 passes through the light transmissive lid 532, and thereafter is reflected on an inner surface of the lid 532, thus generating the reflected light 1-2. Further, the light reflected on the inner surface of the light transmissive lid 532 is reflected on an outer surface of the lid 532 and reflected on the inner surface of the lid 532 again, thus generating the reflected light 1-3. Meanwhile, the SWR includes reflected light 2-1 and 2-2. Diffracted light 2 is generated by the light modulating element 510. The diffracted light 2 is reflected on the outer surface of the light transmissive lid 532 and reflected on the inner surface of the lid 532 again, thus generating the reflected light 2-1. The reflected light 2-1 is reflected on the outer surface of the lid 532 and reflected on the inner surface of the lid 532 again, thus generating the reflected light 2-2.

(3) GBR (Gap Bottom Reflection) is the optical noise caused by the reflection and scattering from a lower surface of the light modulating element 510. Although not shown in the drawing, incident light passing through a gap between one light modulating element and a neighboring light modulating element is reflected on the substrate 500, thus causing optical noise. This optical noise is called GBR.

Such optical noise negatively affects light devices, such as the optical modulator. Especially, in the event that the light transmissive lid approaches the light modulating element so as to miniaturize the light modulator package, the effect of the optical noise is serious. Therefore, the optical noise must be eliminated so as to accomplish the miniaturization of the light modulator package.

SUMMARY OF THE INVENTION

Accordingly, the present invention has been made keeping in mind the above problems occurring in the prior art, and an object of the present invention is to provide a light modulator package having an inclined light transmissive lid which is provided on a base substrate and is inclined relative to a reflective surface of a mirror layer of light modulating elements, thus eliminating optical noise.

In order to accomplish the above object, the present invention provides a light modulator package including a substrate, a light modulating device having a plurality of light modulating elements provided on the substrate and reflecting or diffracting incident light, a joint layer provided on the substrate to surround the light modulating device, and a light transmissive lid attached to the joint layer such that an outer surface of the light transmissive lid is inclined relative to a reflective surface of the light modulating elements of the light modulating device and covering the light modulating elements.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a light modulator package having an inclined light transmissive lid, according to the preferred embodiments of this invention, will be described with reference to the accompanying drawings.

Figure 1:
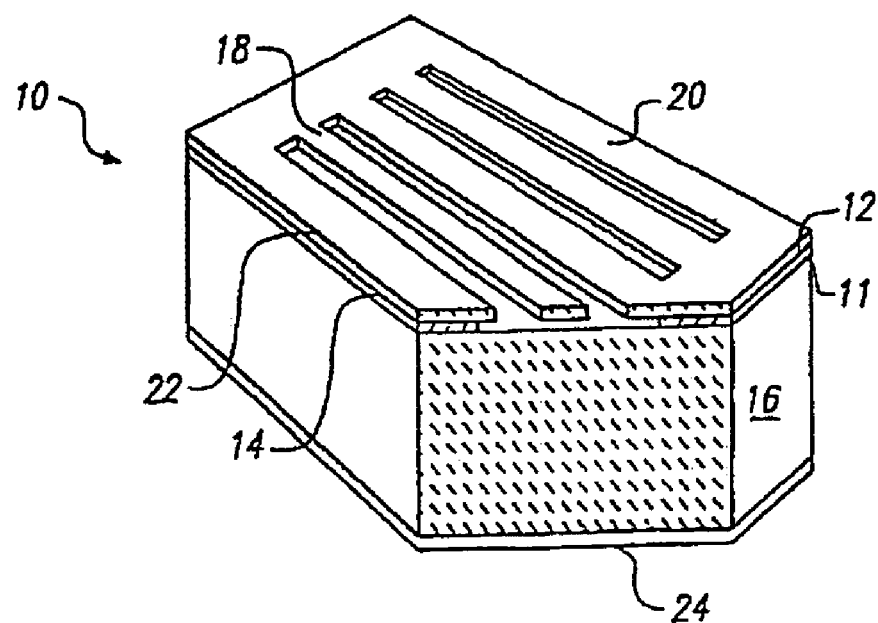
FIG. 1 illustrates a grating light modulator adopting an electrostatic manner according to conventional technology.
Figure 2:
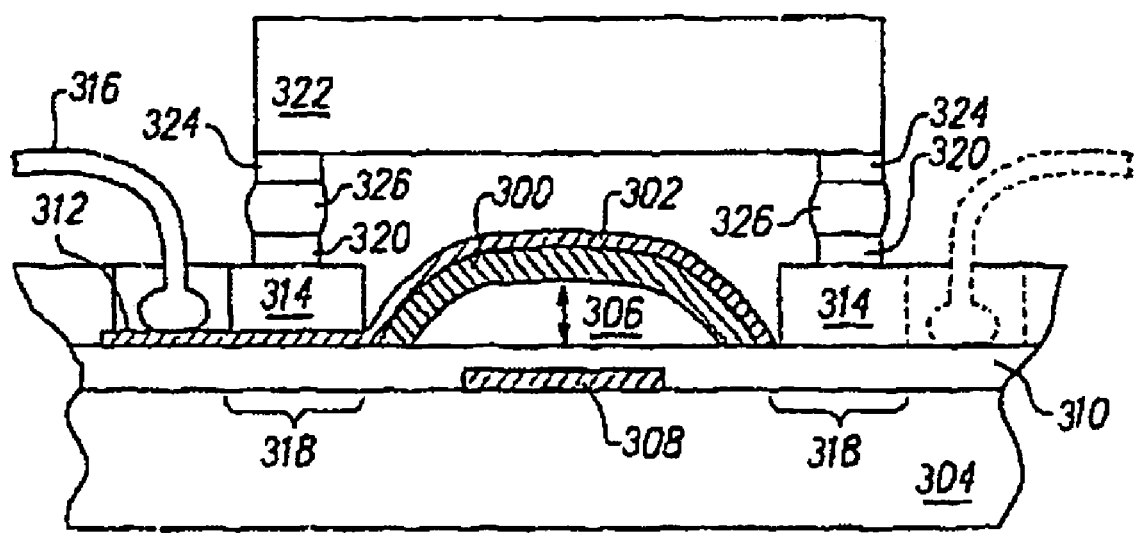
FIG. 2 is a sectional view to schematically show a conventional package.
Figure 3:
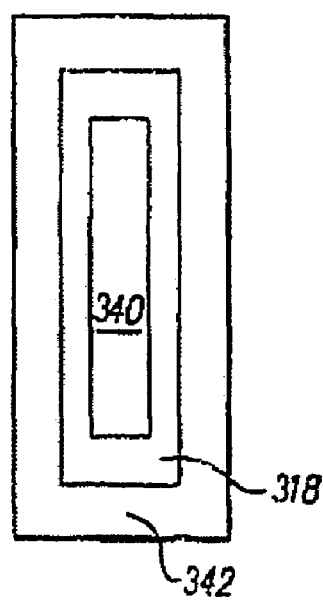
FIG. 3 is a plan view of an exemplary package shown in FIG. 2.
Figure 4:
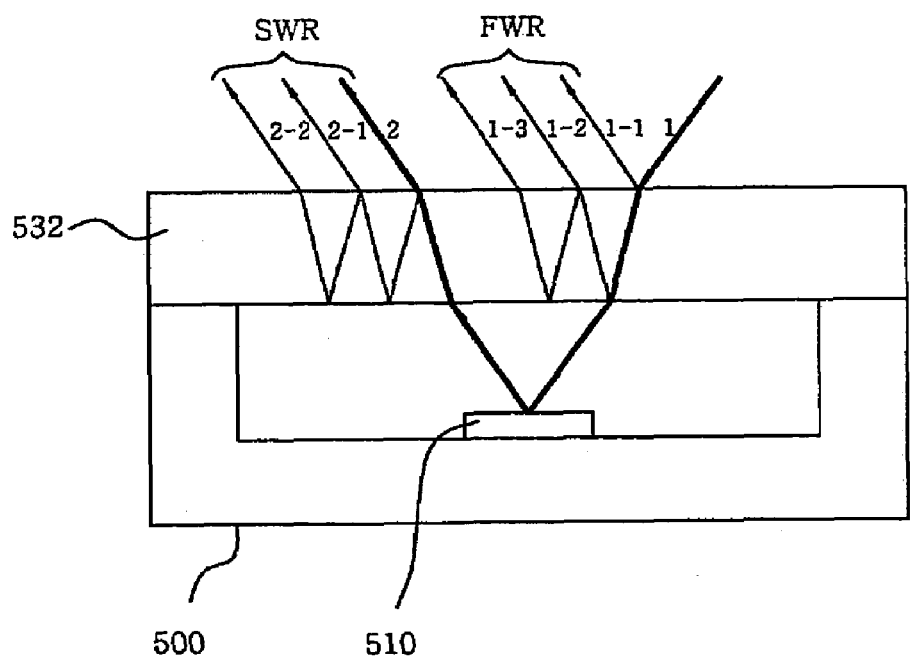
FIG. 4 is a view illustrating optical noise of a light modulator package according to conventional technology.
Figure 5A:
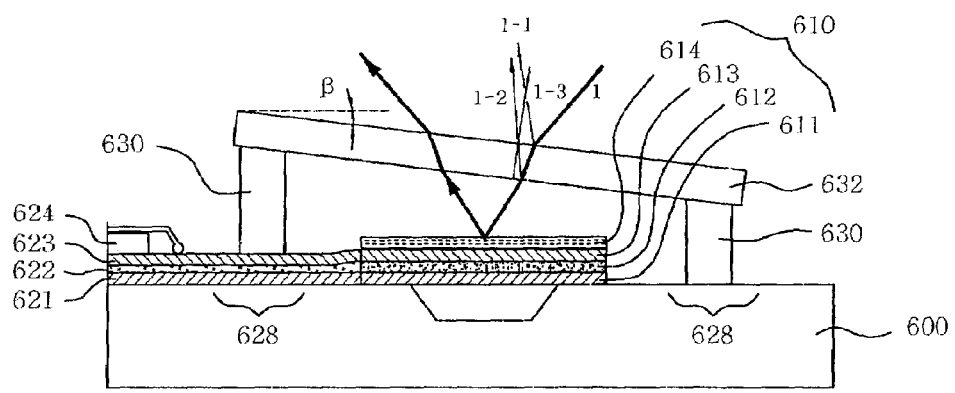
FIG. 5A is a sectional view of a light modulator package having an inclined light transmissive lid, according to an embodiment of the present invention.

FIG. 5A is a sectional view of a light modulator package having an inclined light transmissive lid, according to the first embodiment of the present invention.

Referring to the drawing, the light modulator package having the inclined light transmissive lid according to the first embodiment of this invention is provided with a semiconductor substrate 600, light modulating elements 610 formed on the semiconductor substrate 600, and a light transmissive lid 632 which covers the light modulating elements 610.

The light modulating elements 610 formed on the substrate 600 comprise a lower electrode layer 611, a piezoelectric material layer 612, an upper electrode layer 613, and a mirror layer 614.

When voltage is applied to the lower and upper electrode layers 611 and 613 of the light modulating elements 610, the piezoelectric material layer 612 shrinks or expands to generate an upward or downward driving force, thus moving the mirror layer 614 up and down.

In order to apply an external voltage to the lower and upper electrode layers 611 and 613 of the light modulating elements 610, a lower electrode signal line 621 and an upper electrode signal line 623 are formed at regions outside a lid sealing region 628 of the substrate 600. Also, an insulation layer 622 is provided to electrically insulate the lower electrode signal line 621 from the upper electrode signal line 623. Further, a passivation layer 624 is formed on an upper side of the region outside the lid sealing region 628 of the substrate 600.

The light transmissive lid 632 hermetically seals the light modulating elements 610. Preferably, the light transmissive lid 632 is formed of an optical quality material so as to provide a good seal. The surface of the light transmissive lid 632 may be coated with a reflective material to achieve a variety of purposes including filtering undesired radiation, enhancing reflectivity or decreasing reflectivity.

The light transmissive lid 632 has a size appropriate to hermetically seal the light modulating elements 610.

Further, a spacer 630 is fabricated using a metal or an adhesive through a conventional semiconductor manufacturing technology. The spacer 630 provides an air space between the light transmissive lid 632 and the light modulating elements 610.

As shown in the drawing, the light transmissive lid 632 according to this invention is attached to the substrate 600 in such a way as to be inclined relative to the surface of the mirror layer 614 of the light modulating elements 610.

As such, when the light transmissive lid 632 is attached to the substrate 600 such that the surface of the light transmissive lid 632 is inclined relative to the surface of the mirror layer 614 of the light modulating elements 610, optical noise is reduced.

Particularly, as shown in the drawing, when an inclination angle $\beta$ of the light transmissive lid 632 is increased, optical noise caused by FWR is considerably reduced. That is, when the inclination angle $\beta$ is increased, the direction of FWR 1-1, 1-2 and 1-3 generated by the reflection of incident light 1 on outer and inner surfaces of the light transmissive lid 632 becomes distant from the exit direction of diffracted light 2. Hence, the FWR is eliminated.

Figure 5B:
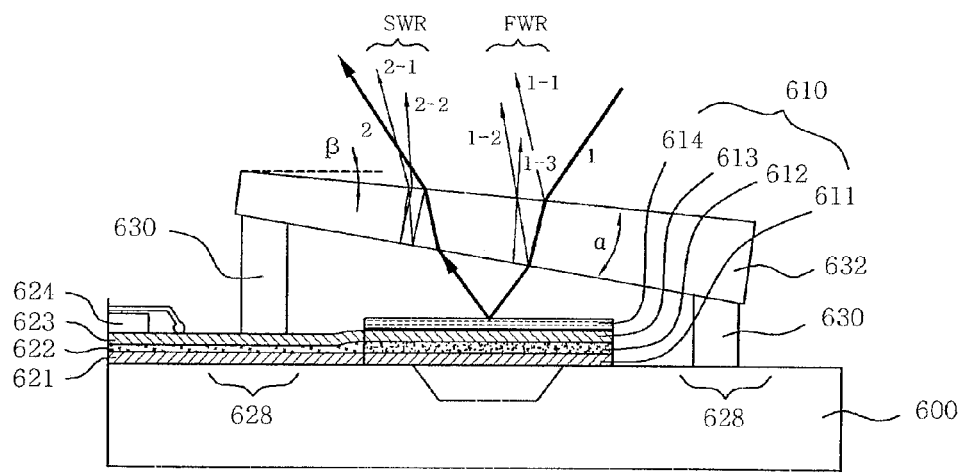
FIG. 5B is a sectional view of a light modulator package having an inclined light transmissive lid, according to another embodiment of the present invention.

FIG. 5B is a sectional view of a light modulator package having an inclined light transmissive lid, according to the second embodiment of the present invention.

Referring to the drawing, the light modulator package having the inclined light transmissive lid, according to the second embodiment of this invention, is provided with a semiconductor substrate 600, light modulating elements 610 formed on the semiconductor substrate 600, and a wedge-shaped light transmissive lid 632 which covers the light modulating elements 610.

The light modulating elements 610 formed on the substrate 600 comprise a lower electrode layer 611, a piezoelectric material layer 612, an upper electrode layer 613, and a mirror layer 614.

When voltage is applied to the lower and upper electrode layers 611 and 613 of the light modulating elements 610, the piezoelectric material layer 612 shrinks or expands to generate an upward or downward driving force, thus moving the mirror layer 614 up and down.

In order to apply an external voltage to the lower and upper electrode layers 611 and 613 of the light modulating elements 610, a lower electrode signal line 621 and an upper electrode signal line 623 are formed at regions outside a lid sealing region 628 of the substrate 600. Also, an insulation layer 622 is provided to electrically insulate the lower electrode signal line 621 from the upper electrode signal line 623. Further, a passivation layer 624 is formed on an upper side of the region outside the lid sealing region 628 of the substrate 600.

The light transmissive lid 632 hermetically seals the light modulating elements 610. Preferably, the light transmissive lid 632 is formed of an optical quality material so as to provide a good seal. The surface of the light transmissive lid 632 may be coated with a reflective material to achieve a variety of purposes including filtering undesired radiation, increasing reflectivity or decreasing reflectivity.

The light transmissive lid 632 has a size appropriate to hermetically seal the light modulating elements 610.

Further, a spacer 630 is fabricated through a conventional semiconductor manufacturing technology to have the shape of a ring surrounding the periphery of one surface of the lid 632 using a metallic material or an adhesive. The spacer 630 defines an air space between the light transmissive lid 632 and the light modulating elements 610.

As shown in the drawing, the light transmissive lid 632 according to the second embodiment of this invention has a wedge shape, and is attached to the substrate 600 such that the lid 632 is inclined relative to the surface of the mirror layer 614 of the light modulating elements 610.

As such, when the light transmissive lid 632 is attached to the substrate 600 such that the surface of the light transmissive lid 632 is inclined relative to the surface of the mirror layer 614 of the light modulating elements 610, both FWR and SWR are reduced.

That is, as shown in the drawing, when an inclination angle β of the light transmissive lid 632 is increased, FWR noise is considerably reduced.

Further, when a taper angle α of the light transmissive lid 632 is increased, it is possible to eliminate SWR. That is, as shown in the drawing, diffracted light 2 generated by the light modulating elements 610 passes through the inner surface of the light transmissive lid 632, and thereafter is reflected on an outer surface of the light transmissive lid 632, thus generating reflected light 2-1. The light reflected on the outer surface is reflected on the inner surface of the lid 632, thus generating reflected light 2-2. While such a process is repeated, SWR designated by reference numerals 2-1 and 2-2 are generated. When the taper angle α of the light transmissive lid 632 is larger than the divergence angle θ, exit light passing through the outer surface of the light transmissive lid 632 is distant from diffracted light. Thus, when filtering the diffracted light, the effect of the reflected light is attenuated, so that optical noise caused by SWR is reduced.

Figure 5C:
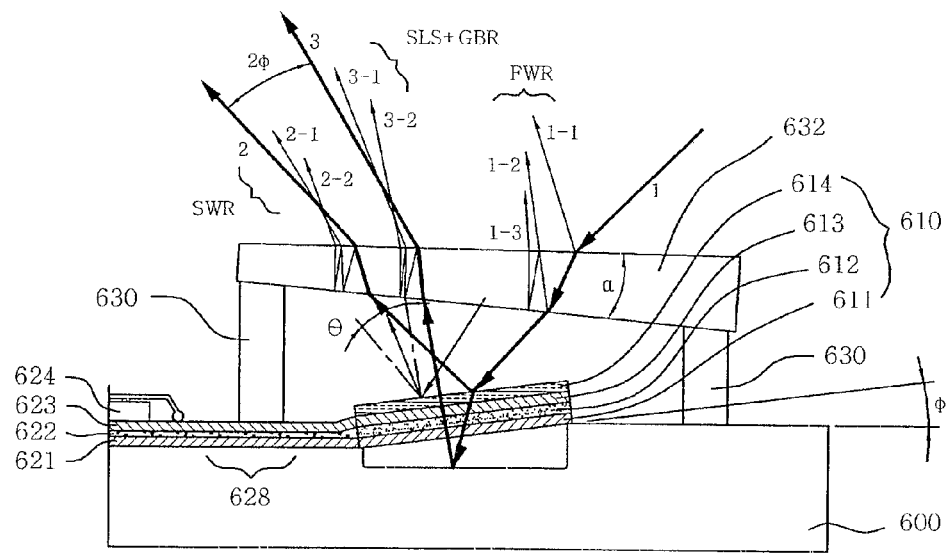
FIG. 5C is a sectional view of a light modulator package having an inclined light transmissive lid, according to a further embodiment of the present invention.

FIG. 5C is a sectional view of a light modulator package having an inclined light transmissive lid, according to the third embodiment of the present invention.

Referring to the drawing, the light modulator package having the inclined light transmissive lid according to the third embodiment of this invention is provided with a semiconductor substrate 600, light modulating elements 610 formed on the semiconductor substrate 600, and a wedge-shaped light transmissive lid 632 which covers the light modulating elements 610.

The light modulating elements 610 formed on the substrate 600 comprise a lower electrode layer 611, a piezoelectric material layer 612, an upper electrode layer 613, and a mirror layer 614.

When voltage is applied to the lower and upper electrode layers 611 and 613 of the light modulating elements 610, the piezoelectric material layer 612 shrinks or expands to generate an upward or downward driving force, thus moving the mirror layer 614 up and down. In this case, neighboring light modulating elements 610 are spaced apart form each other by a predetermined interval, so that incident light passes through the light modulating elements 610 and is reflected on the surface of the substrate 600, thus generating optical noise. However, as shown in the drawing, when the light modulating elements 610 are inclined relative to the surface of a recess, GBR is reduced. In a detailed description, as shown in the drawing, light 3 reflected on the surface of the substrate 600 is nearer to incident light 1, as compared to diffracted light 2. Thereby, when filtering the diffracted light 2, the effect of the reflected light is attenuated, so that noise caused by GBR is eliminated.

Meanwhile, in order to apply an external voltage to the lower and upper electrode layers 611 and 613 of the light modulating elements 610, a lower electrode signal line 621 and an upper electrode signal line 623 are formed at regions outside a lid sealing region 628 of the substrate 600. Also, an insulation layer 622 is formed to electrically insulate the lower electrode signal line 621 from the upper electrode signal line 623. Further, a passivation layer 624 is formed on an upper side of the region outside the lid sealing region 628 of the substrate 600.

The light transmissive lid 632 hermetically seals the light modulating elements 610. Preferably, the light transmissive lid 632 is made of an optical quality material so as to execute a good seal. The surface of the light transmissive lid 632 may be coated with a reflective material to achieve various purposes including filtering undesired radiation and increasing reflectivity or decreasing reflectivity.

The light transmissive lid 632 has a size sufficient to hermetically seal the light modulating elements 610.

Further, a spacer 630 is fabricated through a conventional semiconductor manufacturing technology to have the shape of a ring surrounding the periphery of one surface of the lid using a metallic material or an adhesive. The spacer 630 defines an air space between the light transmissive lid 632 and the light modulating elements 610.

As shown in the drawing, the light transmissive lid 632 according to the third embodiment of this invention has a wedge shape, and is attached to the substrate 600 such that the outer surface of the lid 632 is inclined relative to a surface of the mirror layer 614 of the light modulating elements 610. Further, as shown in the drawing, the light transmissive lid 632 is attached to the substrate 600 such that the inner surface of the lid 632 is inclined relative to the surface of the mirror layer 614 of the light modulating elements 610. Thereby, both FWR and SWR are reduced.

As described above, an outer surface of a light transmissive lid is inclined at a predetermined angle, thus eliminating FWR, and the light transmissive lid is constructed to have a wedge shape, thus eliminating SWR.

Further, according to the present invention, light modulating elements are inclined relative to the surface of a substrate, thus eliminating GBR.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A light modulator package, comprising:
a substrate;
a light modulating device comprising a plurality of light modulating elements provided on the substrate, and reflecting or diffracting incident light;
a joint layer provided on the substrate to surround the light modulating device;
a light transmissive lid attached to the joint layer such that an outer surface of the light transmissive lid is inclined relative to a reflective surface of the light modulating elements of the light modulating device, and covering the light modulating elements; and wherein at least one of the plurality of the light modulating elements comprises a mirror layer and a piezoelectric layer operable to shrink and expand to move the mirror layer toward and away from the inclined light transmissive lid during actuation of the light modulating device.

2. The light modulator package as set forth in claim 1, wherein the piezoelectric layer comprises:

a first electrode layer;

a piezoelectric material layer; and a second electrode layer separated from the first electrode layer by the piezoelectric material layer.

3. The light modulator package as set forth in claim 1, wherein the light transmissive lid has a wedge shape, with the outer surface of the light transmissive lid inclined relative to the reflective surface of the light modulating elements of the light modulating device.

4. The light modulator package as set forth in claim 3, wherein an inner surface of the light transmissive lid is inclined relative to the reflective surface of the light modulating elements of the light modulating device.

5. The light modulator package as set forth in claim 1, wherein the light modulating elements of the light modulating device are inclined relative to a surface of the substrate, and are spaced apart from the surface of the substrate.

* * * * *